United States Patent
Uda et al.

(10) Patent No.: US 9,834,278 B2
(45) Date of Patent: Dec. 5, 2017

(54) DRIVE UNIT AND ELECTRIC-MOTOR-ASSISTED BICYCLE

(71) Applicant: YAMAHA HATSUDOKI KABUSHIKI KAISHA, Iwata-shi, Shizuoka (JP)

(72) Inventors: Masatsugu Uda, Shizuoka (JP); Ryota Suzuki, Shizuoka (JP); Yasunori Mano, Shizuoka (JP); Tomohiro Usami, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/453,973

(22) Filed: Mar. 9, 2017

(65) Prior Publication Data

US 2017/0313383 A1 Nov. 2, 2017

(30) Foreign Application Priority Data

Apr. 28, 2016 (JP) .................................. 2016-091469

(51) Int. Cl.
*B62M 6/55* (2010.01)
*B62M 6/50* (2010.01)
*F16D 41/24* (2006.01)

(52) U.S. Cl.
CPC ................ *B62M 6/55* (2013.01); *B62M 6/50* (2013.01); *F16D 41/24* (2013.01)

(58) Field of Classification Search
CPC ............ B62M 6/55; B62M 6/50; F16D 41/24
See application file for complete search history.

(56) References Cited

U.S. PATENT DOCUMENTS

| | | | |
|---|---|---|---|
| 6,073,717 A | 6/2000 | Yamamoto et al. | |
| 7,736,253 B2* | 6/2010 | Matsumoto | B62M 9/14 474/69 |
| 9,227,694 B2* | 1/2016 | Hino | B62M 6/55 |
| 2014/0166384 A1* | 6/2014 | Ishida | B62M 6/50 180/206.3 |
| 2015/0336631 A1* | 11/2015 | Nishikawa | B62K 19/34 74/670 |

(Continued)

FOREIGN PATENT DOCUMENTS

| | | |
|---|---|---|
| EP | 1 088 752 A2 | 4/2001 |
| EP | 2 743 167 A1 | 6/2014 |

(Continued)

*Primary Examiner* — Kevin Hurley
*Assistant Examiner* — Gabriela C Craciun
(74) *Attorney, Agent, or Firm* — Keating and Bennett, LLP

(57) ABSTRACT

In a drive unit in an electric-motor-assisted bicycle, as viewed in an axial direction of the crank axle, a substrate housed in a housing does not overlap a reduction gear but overlaps a driven gear. The substrate is disposed around the crank axle and includes a component side extending in a direction crossing the central axis of the crank axle. The substrate extends in directions crossing radial directions of the crank axle. One end of the substrate in the direction in which the substrate extends is located on the side of the straight line connecting the shaft center of the crank axle and the shaft center of the motor output shaft as viewed in the axial direction, that is opposite to the side having the other end of the substrate in the direction in which the substrate extends.

9 Claims, 8 Drawing Sheets

(56) References Cited

U.S. PATENT DOCUMENTS

2016/0272278 A1* 9/2016 Yamada .................. B62M 6/50
2016/0288872 A1* 10/2016 Shahana ................. B62M 6/55

FOREIGN PATENT DOCUMENTS

| EP | 2 743 169 A1 | | 6/2014 |
|----|--------------|---|--------|
| EP | 2 759 464 A1 | | 7/2014 |
| EP | 2 783 972 A1 | | 10/2014 |
| JP | 2008114851 A | * | 5/2008 |
| JP | 2009208710 A | * | 9/2009 |
| JP | 2014-196080 A | | 10/2014 |

* cited by examiner

DRIVE UNIT AND ELECTRIC-MOTOR-ASSISTED BICYCLE

CROSS REFERENCE TO RELATED APPLICATIONS

This application claims the benefit of priority to Japanese Patent Application No. 2016-091469 filed on Apr. 28, 2016. The entire contents of this application are hereby incorporated herein by reference.

BACKGROUND OF THE INVENTION

1. Field of the Invention

The present invention relates to drive units and electric-motor-assisted bicycles, and more particularly to a drive unit attached to a vehicle-body frame included in an electric-motor-assisted bicycle and an electric-motor-assisted bicycle including such a drive unit.

2. Description of the Related Art

Bicycles are used by many people, regardless of age and gender, as a handy transportation means. In recent years, electric-motor-assisted bicycles that add driving forces from the motor to pedaling forces from the rider to assist the rider have become popular. Such an electric-motor-assisted bicycle is disclosed in JP 2014-196080 A, for example.

JP 2014-196080 A describes an electric-motor-assisted bicycle that includes a drive unit. The drive unit includes a housing and a crank axle. The crank axle extends through the housing in the left-to-right direction with respect to the vehicle. Pedals are mounted on the crank axle via arms. The drive unit is attached to the bottom of the vehicle-body frame.

The drive unit further includes a motor and a substrate. The motor is housed in the housing and generates drive forces to be added to the tread force of the rider to assist the rider. The substrate is housed in the housing and controls the electric power supply to the motor.

SUMMARY OF THE INVENTION

A plurality of circuits or circuit elements are mounted on the substrate to control the operation of the motor. To achieve this, it is preferable that the substrate includes a component side (or component sides) that is/are as large as possible. However, substrates with larger component sides have increased substrate sizes. A substrate of large size limits how the other components in the housing may be arranged. If a sufficient degree of freedom in terms of how to arrange the components in the housing is to be provided, the size of the housing may increase.

As discussed above, the drive unit is attached to the bottom of the vehicle-body frame. Thus, larger housing sizes may reduce minimum ground clearance (i.e., a distance between the drive unit and the ground), increase Q Factor, or increase rear/center length. Larger housing sizes may also limit the manner in which the rear suspension and battery are able to be arranged.

Preferred embodiments of the present invention reduce the size of the housing of the drive unit included in an electric-motor-assisted bicycle.

A drive unit according to a preferred embodiment of the present invention is attached to a vehicle-body frame of an electric-motor-assisted bicycle and generates a driving force to be transmitted to a rear wheel. The drive unit includes a housing, a crank axle, a crank rotation input shaft, a motor, a reduction gear, a resultant-force output axle, and a substrate. The crank axle extends through the housing in a left-to-right direction with respect to the bicycle. The crank axle extends through the crank rotation input shaft. An end of the crank rotation input shaft is coupled to the crank axle. The motor is housed in the housing. The motor includes a motor output shaft. An output gear is provided on the motor output shaft. The reduction gear is housed in the housing. The reduction gear engages the output gear. The crank axle extends through the resultant-force output axle. The resultant-force output axle is connected to the other end of the crank rotation input shaft with a one-way clutch provided in between. The resultant-force output axle includes a driven gear that engages the reduction gear. The substrate is housed in the housing. As viewed in an axial direction of the crank axle, the substrate does not overlap the reduction gear but does overlap the driven gear. The substrate is disposed around the crank axle. The substrate includes a component side that extends in a direction crossing a central axis of the crank axle. The substrate extends in directions crossing radial directions of the crank axle. The substrate includes a first end and a second end. The second end is located opposite to the first end in a direction in which the substrate extends. Supposing that a straight line connecting a shaft center of the crank axle and a shaft center of the motor output shaft as viewed in the axial direction is a first straight line (L1), a straight line passing through the shaft center of the crank axle and perpendicular or substantially perpendicular to the first straight line as viewed in the axial direction is a second straight line (L2), a straight line passing through the shaft center of the motor output shaft and perpendicular or substantially perpendicular to the first straight line as viewed in the axial direction is a third straight line (L3), a region located on one side of the first straight line as viewed in the axial direction is a first region (G1), and a region located on the other side of the first straight line as viewed in the axial direction is a second region (G2), then, the first end is located in the first region as viewed in the axial direction, the second end is located in the second region as viewed in the axial direction, and the first end and the second end are located between the second straight line and the third straight line as viewed in the axial direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
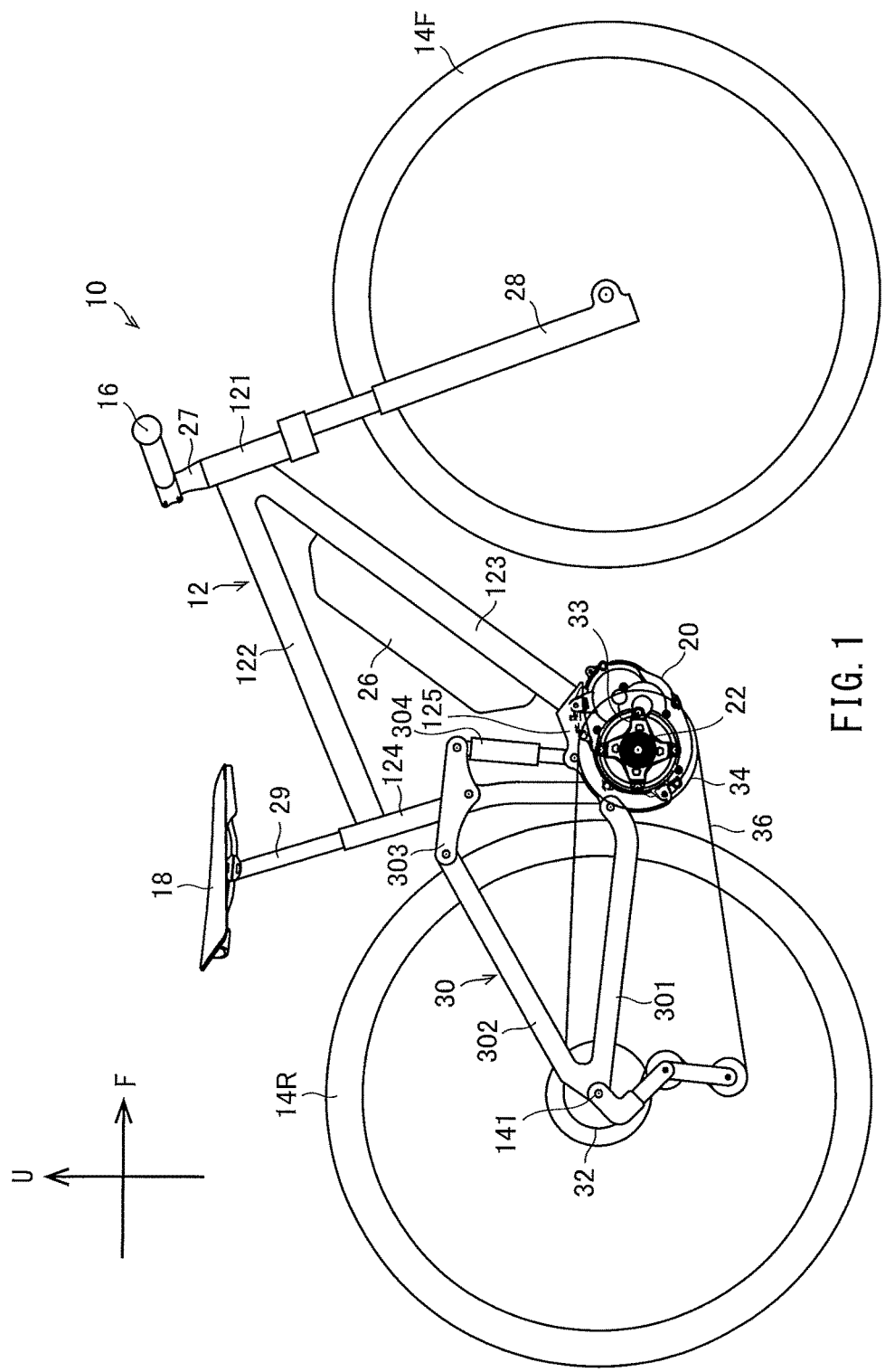
FIG. 1 is a right-side view of an electric-motor-assisted bicycle according to a preferred embodiment of the present invention.

The present inventors conducted extensive research to find a way to reduce the size of the housing of the drive unit. The inventors focused on how the various components of the drive unit may be arranged.

A drive unit according to a preferred embodiment of the present invention preferably includes a housing, a crank axle, a motor, and a reduction gear. The housing is attached to the vehicle-body frame. The crank axle extends through the housing in the left-to-right direction with respect to the vehicle. The motor is housed in the housing. The reduction gear is housed in the housing and transmits driving forces from the motor to a resultant-force output axle through which the crank axle is extended.

The output shaft of the motor and the rotatable shaft of the reduction gear are positioned to be parallel or substantially parallel to the crank axle. An output gear on the output shaft of the motor engages the reduction gear. The reduction gear engages the driven gear of the resultant-force output axle. That is, as viewed in an axial direction of the crank axle, the motor and reduction gear are located near or adjacent to the crank axle.

To reduce the size of the housing, for example, (1) the dimension of the housing as measured in the left-to-right direction with respect to the vehicle may be reduced, or (2) the dimension of the housing as viewed in an axial direction of the crank axle may be reduced. The present inventors did further research to achieve goals (1) and (2), and achieved the following discoveries.

The drive unit further includes a substrate housed in the housing. A plurality of circuits or circuit elements are mounted on the substrate to control the operation of the motor. To achieve this, a substrate preferably includes enlarged component sides. To achieve enlarged component sides, the substrate may be rectangular or substantially rectangular, for example.

Such a substrate extends across a large area, from the space in which the crank axle is provided to the space in which the reduction gear is provided to the space in which the motor is provided, as described in JP 2014-196080 A, for example. In this case, if it is decided how to arrange the one-way clutch coaxial with the crank axle, the reduction gear, the motor, and other components (in the axial direction of the crank axle) so as to prevent them from contacting the substrate, it is difficult to reduce the dimension of the housing as measured in the left-to-right direction with respect to the vehicle. The same applies when the substrate is positioned away from the one-way clutch, the reduction gear, and the motor in the axial direction of the crank axle to prevent the substrate from contacting these components.

To reduce the size of the housing as viewed in an axial direction of the crank axle, for example, the substrate may be positioned to overlap the motor and the reduction gear as viewed in an axial direction of the crank axle. In this case, the substrate may be positioned on the same side of the straight line connecting the shaft center of the crank axle and the shaft center of the output shaft of the motor as viewed in an axial direction of the crank axle as the side including the shaft center of the rotatable shaft of the reduction gear. However, if the substrate is to be positioned so as not to contact the reduction gear, it is difficult to reduce the size of the housing as viewed in an axial direction of the crank axle.

In view of this, the substrate may be positioned on the side of the above-mentioned straight line opposite to that including the shaft center of the rotatable shaft of the reduction gear. In this case, it is not necessary to account for the issue of contact with the reduction gear when disposing the substrate.

However, with this way of disposing the substrate, it is difficult to reduce the size of the housing as viewed in an axial direction of the crank axle. In view of this, first and second notches may be provided on the edge of the substrate. In this case, for example, the crank rotation input shaft that rotates together with the crank axle may be positioned in the first notch. The output shaft of the motor may be positioned in the second notch.

A substrate with such notches allows the substrate to be positioned close to the straight line as viewed in an axial direction of the crank axle. On the other hand, the notches reduce the component side area of the substrate.

The present inventors did further research based on the above-discussed discoveries. The inventors discovered that, in order to prevent the component side area of the substrate from decreasing and at the same time reduce the size of the housing, the way of disposing the substrate and the shape of the substrate should be considered. Preferred embodiments of the present invention were developed based on these discoveries.

Preferred embodiments of the present invention will be described below with reference to the drawings. The same or corresponding elements and features are labeled with the same characters in the drawings and their description will not be repeated.

Referring to FIG. 1, an electric-motor-assisted bicycle 10 according to a preferred embodiment of the present invention will be described. FIG. 1 is a schematic right-side view of the electric-motor-assisted bicycle 10.

In the following description, the directions "front/forward", "rear(ward)", "left", "right", "top/upward" and "bottom/downward" mean directions as perceived by a rider sitting on the saddle 18 of the electric-motor-assisted bicycle 10. In the drawings referred to in the following description, arrow "F" indicates the forward direction with respect to the vehicle; arrow "U" indicates the upward direction with respect to the vehicle; arrow "L" indicates the left direction with respect to the vehicle; and arrow "R" indicates the right direction with respect to the vehicle.

The electric-motor-assisted bicycle 10 preferably includes a vehicle-body frame 12, a front wheel 14F, a rear wheel 14R, handlebars 16, a saddle 18, a drive unit 20, and a battery 26.

The vehicle-body frame 12 includes a head tube 121, a top tube 122, a down tube 123, a seat tube 124, and a bracket 125.

The head tube 121 is located at the front of the vehicle-body frame 12 and extends in a top/bottom direction. A stem 27 extends into the head tube 121 such that the stem is rotatable. Handlebars 16 are fixed to the top end of the stem 27. A front fork 28 is fixed to the bottom end of the stem 27. The front wheel 14F is rotatably attached to the bottom end of the front fork 28. That is, the front wheel 14F is supported by the vehicle-body frame 12 with the stem 27 and front fork 28 provided in between.

The top tube 122 is located rearward of the head tube 121 and extends in the front/rear direction. The front end of the top tube 122 is connected to the head tube 121. The rear end of the top tube 122 is connected to the seat tube 124.

The down tube 123 is located rearward of the head tube 121 and extends in the front/rear direction. The down tube 123 is located below the top tube 122. The front end of the down tube 123 is connected to the head tube 121. In the present preferred embodiment, the front end of the down tube 123 is also connected to the front end of the top tube 122. The rear end of the down tube 123 is connected to the bracket 125.

The battery 26 is attached to the down tube 123, for example. The battery 26 supplies the drive unit 20 with electric power. The battery 26 includes a battery and a controller. The battery is a chargeable/dischargeable battery. The controller of the battery is configured or programmed to control the battery to be charged or discharged, and to monitor battery output current, remaining battery level, and other parameters.

The seat tube 124 is located rearward of the top tube 122 and down tube 123 and extends in the top/bottom direction. The bottom end of the seat tube 124 is connected to the bracket 125. In other words, the seat tube 124 extends upwardly from the bracket 125.

The seat tube 124 is bent at the center or substantially at the center as measured in the top/bottom direction. As such, the lower portion of the seat tube 124 extends in the top/bottom direction while the upper portion of the seat tube 124 extends in a direction angled relative to the top/bottom direction.

The seat post 29 extends into the seat tube 124. The saddle 18 is attached to the top end of the seat post 29.

The bracket 125 is located at the bottom of the vehicle-body frame 12. The bracket 125 supports the drive unit 20. Preferably, the drive unit 20 generates driving forces to be transmitted to the rear wheel 14R which is located rearward of the front wheel 14F, for example. The drive unit 20 will be described in detail further below.

The vehicle-body frame 12 further includes a swing arm 30, a pair of connecting arms 303, and a suspension 304. The swing arm 30 includes a pair of chain stays 301 and a pair of seat stays 302.

The chain stays 301 extend in the front/rear direction. The chain stays 301 are arranged in the left/right direction. The rear wheel 14R is located between the chain stays 301. Preferably, the chain stays 301 are positioned to be mirror images of each other. In view of this, only the right chain stay 301 is shown in FIG. 1.

The front end of each of the chain stays 301 is attached to the bracket 125. That is, the chain stays 301 extend rearwardly from the bracket 125. The chain stays 301 are positioned such that they are able to swing relative to the bracket 125 about an axis that extends in the left/right direction.

The axle 141 of the rear wheel 14R is attached to the rear ends of the chain stays 301 such that the axle cannot rotate. That is, the rear wheel 14R is supported on the chain stays 301 such that the rear wheel is able to rotate about the axle 141. In short, the rear wheel 14R is supported by the vehicle-body frame 12. A multi-stage driven sprocket 32 is fixed to the rear wheel 14R.

The seat stays 302 extend in the front/rear direction. The seat stays 302 are arranged in the left/right direction. The rear wheel 14R is located between the seat stays 302. Preferably, the seat stays 302 are positioned to be mirror images of each other. In view of this, only the right seat stay 302 is shown in FIG. 1.

The rear end of the left seat stay 302 is connected to the rear end of the left chain stay 301. The rear end of the right seat stay 302 is connected to the rear end of the right chain stay 301.

The connecting arms 303 extend in the front/rear direction. The connecting arms 303 are arranged in the left/right direction. The seat tube 124 is located between the connecting arms 303. Preferably, the connecting arms 303 are positioned to be mirror images of each other. In view of this, only the right connecting arm 303 is shown in FIG. 1.

The connecting arms 303 are attached to the seat tube 124. The connecting arms 303 are positioned to be able to swing relative to the seat tube 124 about an axis that extends in the left/right direction.

As viewed from a side of the vehicle, the front ends of the connecting arms 303 are located forward of the seat tube 124. As viewed from a side of the vehicle, the rear ends of the connecting arms 303 are located rearward of the seat tube 124.

The rear end of the left connecting arm 303 is attached to the front end of the left seat stay 302. The left connecting arm 303 is positioned to be able to swing relative to the left seat stay 302 about an axis that extends in the left/right direction.

The rear end of the right connecting arm 303 is attached to the front end of the right seat stay 302. The right connecting arm 303 is positioned to be able to swing relative to the right seat stay 302 about an axis that extends in the left/right direction.

The suspension 304 is located forward of the seat tube 124 and rearward of the down tube 123. The top end of the suspension 304 is attached to the connecting arms 303. The suspension 304 is positioned to be able to swing relative to the connecting arms 303 about an axis that extends in the left/right direction. The bottom end of the suspension 304 is attached to the bracket 125. The suspension 304 is positioned to be able to swing relative to the bracket 125 about an axis that extends in the left/right direction. The suspension 304 is attached to the bracket 125 at a position that is forward of the position at which the seat tube 124 is attached to the bracket 125.

A driving sprocket 34 is attached to the drive unit 20 with a support 33 provided in between. A chain 36 is wound about the driving sprocket 34 and driven sprocket 32.

Figure 2:
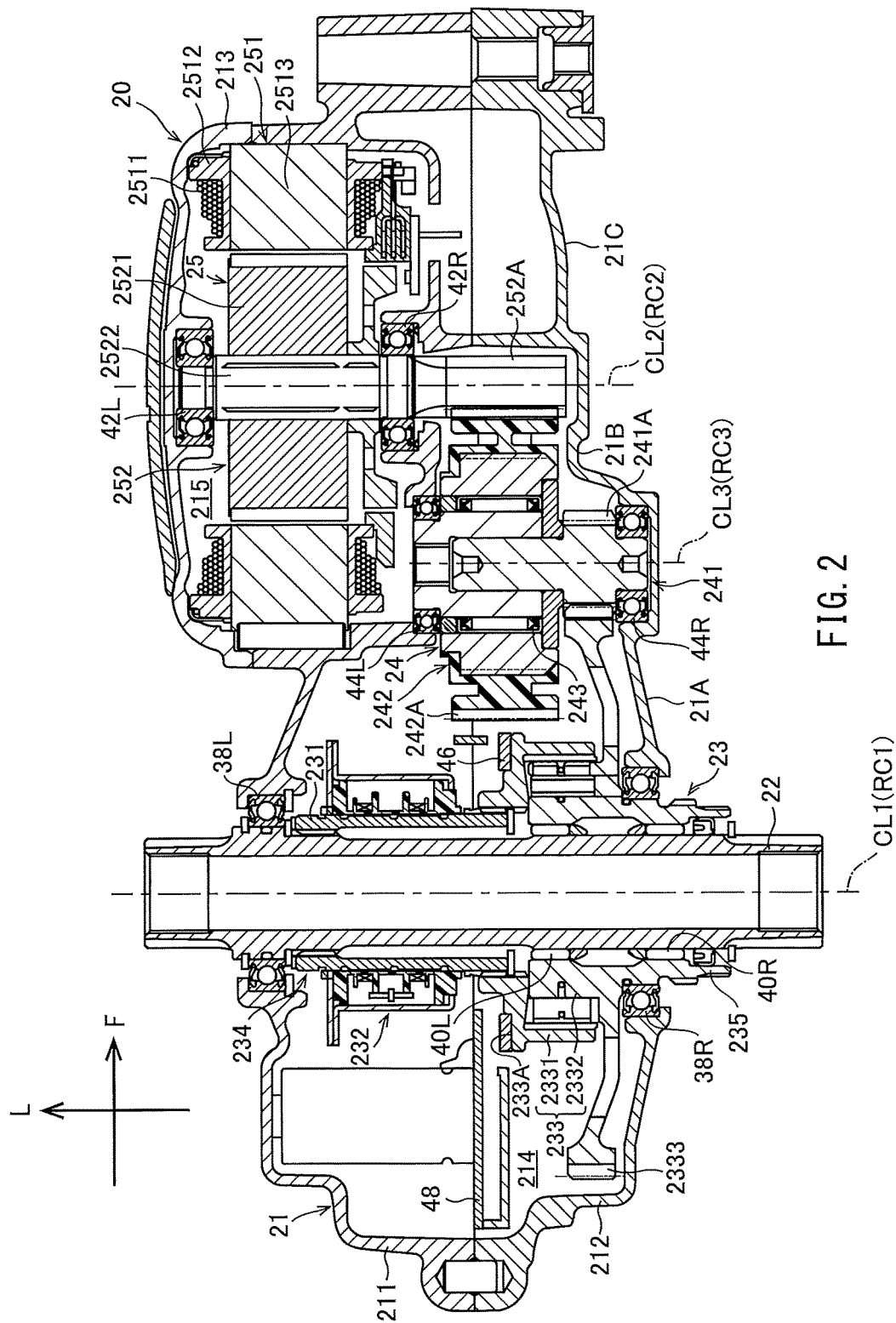
FIG. 2 is a cross-sectional view of the internal construction of a drive unit included in the electric-motor-assisted bicycle shown in FIG. 1.

The drive unit 20 will be described with reference to FIG. 2. FIG. 2 is a vertical cross-sectional view of the internal construction of the drive unit 20.

The drive unit 20 includes a housing 21, a crank axle 22, a rotating shaft 23, a reduction gear 24, and a motor 25.

The housing 21 is fixed to the bracket 125 by a plurality of fasters. The housing 21 includes a housing member 211, a housing member 212, and a cover 213. The housing members 211 and 212 and the cover 213 are made of a metal material, for example. The metal material may be an aluminum alloy, for example.

The housing member 211 is laid over the housing member 212 from the left as measured in the left/right direction. Then, the housing member 211 is fixed to the housing member 212 by a plurality of fasteners. As a result, a space 214 is defined by the housing members 211 and 212.

The cover 213 is laid over the housing member 211 from the left as measured in the left/right direction. Then, the cover 213 is fixed to the housing member 211 by a plurality of fasteners. As a result, a space 215 is defined by the cover 213 outside the housing member 211 (i.e., to the left thereof).

The crank axle 22 extends through the housing 21 in the left/right direction. That is, the central axis CL1 of the crank axle 22 extends in the left/right direction. The central axis CL1 provides the rotational center RC1 of the crank axle 22 as viewed in an axial direction of the crank axle 22.

A bore extends through the crank axle 22 in the axial direction of the crank axle 22. That is, the crank axle 22 is cylindrical or substantially cylindrical.

The crank axle 22 is supported on the housing 21 such that the crank axle is able to rotate relative to the housing about the central axis CL1 of the crank axle 22. A bearing 38L that rotatably supports the crank axle 22 is fixed to the housing member 211. A bearing 38R, which rotatably supports the crank axle 22 with the driven member 2332 of the one-way clutch 233 described further below and the slide bearings 40L and 40R provided in between, is fixed to the housing member 212.

The crank axle 22 extends through the rotating shaft 23. The rotating shaft 23 is housed in the housing 21. The rotating shaft 23 will be described in detail further below.

Figure 3:
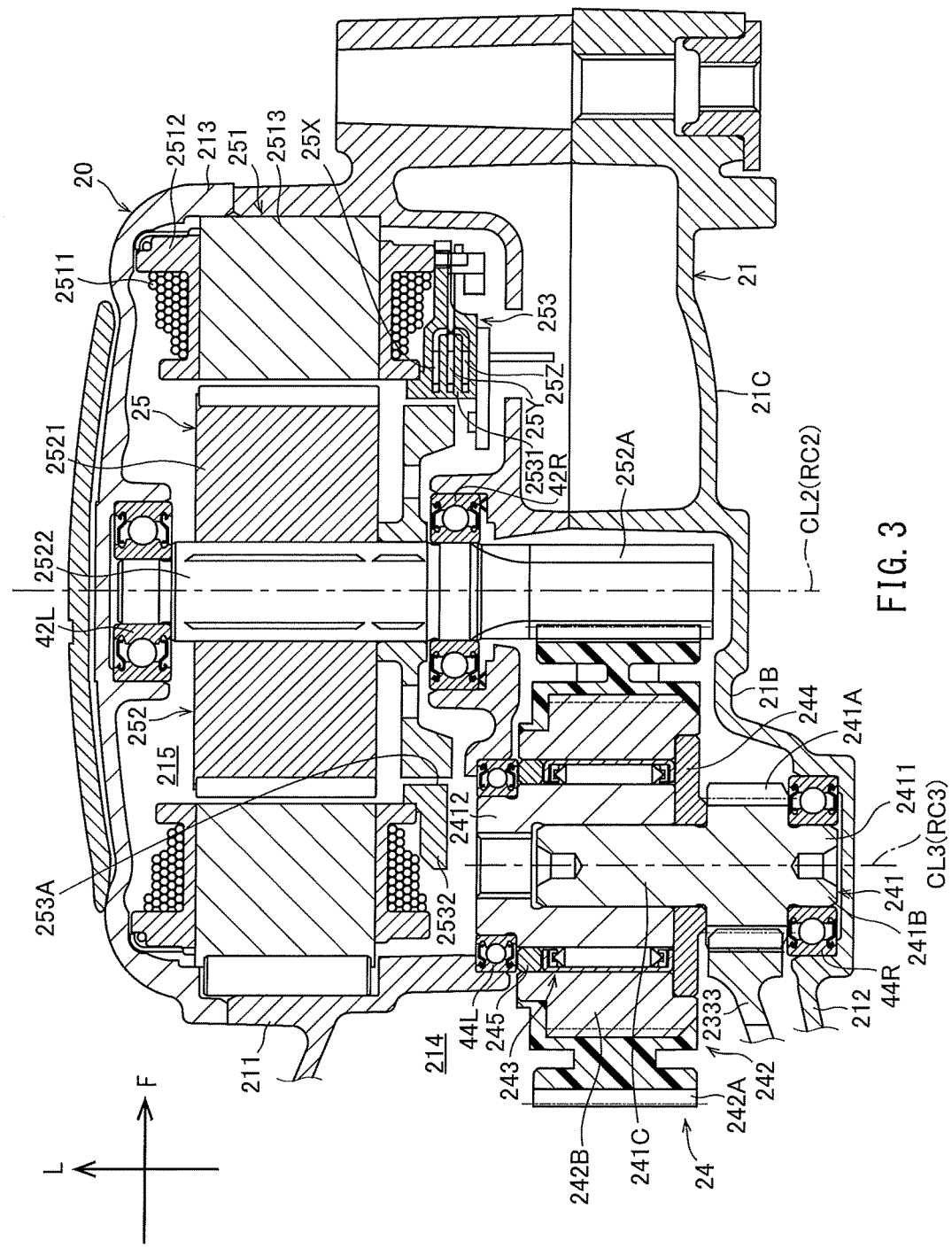
FIG. 3 is an enlarged cross-sectional view of a portion of FIG. 2.

The motor 25 and the reduction gear 24 will be described with reference to FIG. 3. FIG. 3 is an enlarged cross-sectional view of a portion of FIG. 2.

The motor 25 is housed in the housing 21. The motor 25 generates driving forces that assist the rider in propelling the electric-motor-assisted bicycle 10. The motor 25 preferably is a three-phase AC motor, for example. The motor 25 includes a stator 251 and a rotor 252.

The stator 251 includes a plurality of bobbins 2512 (14 bobbins in the present preferred embodiment, for example) around which coils 2511 are wound. An iron core 2513 extends into the bobbins 2512. The stator 251 is located within the space 215. The stator 251 is fixed to the housing member 211.

A support 253 is attached to the stator 251. The support 253 is preferably made of a synthetic resin. A plurality of bus bars 25X, 25Y and 25Z are embedded in the support 253. Each of the bus bars 25X, 25Y and 25Z is connected to a corresponding coil 2511. Controlling the supply of electricity to the bus bars 25X, 25Y and 25Z enables generation of magnetic fields in the stator 251.

The support 253 is annular or substantially annular. The support 253 is located closer to the housing member 211 than the stator 251 is as measured in the axial direction of the rotor 252.

The support 253 includes an embedment portion 2531 in which the bus bars 25X, 25Y and 25Z are embedded and a non-embedment portion 2532 in which the bus bars 25X, 25Y and 25Z are not embedded. The non-embedment portion 2532 has a smaller thickness than the embedment portion 2531. The right end surface of the non-embedment portion 2532, in the axial direction, is located closer to the stator 251 than the right end surface of the embedment portion 2531, in the axial direction.

The rotor 252 is located inside of the stator 251. The central axis CL2 of the rotor 252 is parallel or substantially parallel to the central axis CL1 of the crank axle 22. That is, the rotor 252 is positioned parallel or substantially parallel to the crank axle 22. The central axis CL2 provides the rotational center RC2 of the rotor 252 as viewed in an axial direction of the crank axle 22.

The rotor 252 includes a rotor body 2521 and an output shaft 2522 that defines and functions as the motor output shaft.

The outer periphery of the rotor body 2521 is magnetized to include N- and S-poles arranged alternately in the circumferential direction. In the present preferred embodiment, seven N-poles and seven S-poles are provided, for example.

The output shaft 2522 extends through the rotor body 2521. The output shaft 2522 is fixed to the rotor body 2521. That is, the output shaft 2522 rotates together with the rotor body 2521.

The output shaft 2522 is supported by two bearings 42L and 42R such that the output shaft is able to rotate relative to the housing 21 about the central axis CL2. The bearing 42L is fixed to the cover 213. The bearing 42R is fixed to the housing member 211 to be located to the right of the rotor body 2521 (i.e., farther in a second axial direction).

The output shaft 2522 extends through the housing member 211. An output gear 252A is provided on the portions of the output shaft 2522 that are located within the space 214. The output gear 252A is a helical gear.

The reduction gear 24 is housed in the housing 21. More specifically, the reduction gear 24 is located within the space 214.

A portion of the reduction gear 24 overlaps the motor 25 as viewed in an axial direction of the crank axle 22. A portion of the reduction gear 24 overlaps the non-embedment portion 2532 of the support 253 as viewed in an axial direction of the crank axle 22.

The central axis CL3 of the reduction gear 24 (i.e., the central axis CL3 of the rotational shaft 241) is parallel or substantially parallel to the central axis CL1 of the crank axle 22. That is, the reduction gear 24 is positioned parallel or substantially parallel to the crank axle 22. The central axis CL3 provides the rotational center RC3 of the reduction gear 24 as viewed in an axial direction of the crank axle 22. The rotational center RC3 overlaps the stator 251 as viewed in an axial direction of the crank axle 22.

The reduction gear 24 includes a rotatable shaft 241, a cylindrical portion 242, a one-way clutch 243, a bush bearing 244, and a bush bearing 245. The cylindrical portion 242 is supported by the bush bearings 244 and 245 so as to be rotatable about the rotatable shaft 241.

The rotatable shaft 241 includes a shaft portion 2411 and a cylindrical portion 2412.

The shaft portion 2411 includes a gear 241A. The shaft portion 2411 includes a sub-shaft portion 241B and a sub-shaft portion 241C. The bearing 241B is supported on the housing member 212 by the bearing 44R. The bearing 44R is press-fitted to the housing member 212. The sub-shaft portion 241B is clearance-fitted into the bearing 44R. The sub-shaft portion 241C is press-fitted into the cylindrical portion 2412. When the sub-shaft portion 241C is press-fitted into the cylindrical portion 2412, the gear 241A is located outside (i.e., to the right of) the cylindrical portion 2412 in the axial direction of the shaft portion 2411. The bearing 44L is press-fitted to the left end of the cylindrical portion 2412. The bearing 44L is clearance-fitted to the housing member 211.

As viewed in an axial direction of the cylindrical portion 2412, the left end of the cylindrical portion 2412 is located outward of the inner periphery 253A of the support 253 in radial directions of the rotor 252. A portion of the left end of the cylindrical portion 2412 overlaps the non-embedment portion 2532 of the support 253 as viewed in an axial direction of the cylindrical portion 2412. That is, as the left end of the cylindrical portion 2412 faces the non-embedment portion 2532, which has a smaller thickness, and the cylindrical portion 2412 is brought closer to the stator 251, the dimension of the drive unit 20 as measured in the left-to-right direction is able to be reduced.

The cylindrical portion 242 is cylindrical or substantially cylindrical. Preferably, the cylindrical portion 242 includes a base 242B made of a metal and a gear 242A made of a synthetic resin.

The base 242B is tubular or substantially tubular. Preferably, the base 242B and gear 242A are insert-molded. The gear 242A engages the output gear 252A. The gear 242A is a helical gear. The gear 242A has a larger diameter than the output gear 252A and includes more teeth than the output gear 252A. That is, the rotational speed of the gear 242A is lower than the output gear 252A.

The rotatable shaft 241 extends through the cylindrical portion 242 including this structure. When the rotatable shaft 241 extends into the cylindrical portion 242 (more specifically, the base 242B), the gear 241A is located outward (i.e., to the right) of the cylindrical portion 242 in the axial direction of the rotatable shaft 241.

The one-way clutch 243 is a known shell-shaped one-way clutch, for example. In the one-way clutch 243, a plurality of needle rollers are disposed in a shell-shaped outer wheel. The one-way clutch 243 is located between the rotatable shaft 241 (more particularly, the cylindrical portion 2412) and cylindrical portion 242 (more particularly, the base 242B) in radial directions of the rotatable shaft 241. The outer wheel of the one-way clutch 243 is press-fitted to the base 242B.

As the one-way clutch 243 is thus positioned, when the rotor 252 rotates in the positive direction, the rotatable shaft 241 rotates together with the cylindrical portion 242. That is, driving forces from the motor 25 are transmitted to the gear 2333 via the reduction gear 24. Further, when the motor 24 is stationary and the gear 2333 rotates in the forward direction (i.e., in a direction associated with the advancement of the vehicle), the rotatable shaft 241 rotates relative to the cylindrical portion 242. That is, rotation of the gear 2333 is not transmitted to the rotor 252.

The bush bearing 244 is annular plate shaped or substantially annular plate shaped. The sub-shaft portion 241C extends through the bush bearing 244. The bush bearing 244 is located between the gear 241A and the cylindrical portion 2412 in the axial direction of the rotatable shaft 241.

The bush bearing 244 is located between the rotatable shaft 241 (more specifically, the sub-shaft portion 241C) and the cylindrical portion 242 in radial directions of the rotatable shaft 241. The bush bearing 244 is located to the right of (i.e., farther in the second axial direction than) the one-way clutch 243 in the axial direction of the rotatable shaft 241.

The bush bearing 244 is press-fitted to the base 242B of the cylindrical portion 242. Thus, the bush bearing 244 rotates together with the cylindrical portion 242. The inner periphery of the bush bearing 244 is slidable in a circumferential direction of the rotatable shaft 241 and is able to slightly move in an axial direction of the rotatable shaft 241.

The bush bearing 245 is ring shaped or substantially ring shaped. The bush bearing 245 is located between the rotatable shaft 241 (more specifically, the cylindrical portion 2412) and the cylindrical portion 242 in radial directions of the rotatable shaft 241. The bush bearing 245 is located to the left of (i.e., farther in the first axial direction than) the one-way clutch 243 in the axial direction of the rotatable shaft 241.

The bush bearing 245 is press-fitted into the base 242B of the cylindrical portion 242. That is, the bush bearing 245 rotates together with the base 242B.

The rotatable shaft 241 (more specifically, the cylindrical portion 2412) extends through the bush bearing 245. The inner periphery of the bush bearing 245 is slidable in a circumferential direction relative to the rotatable shaft 241.

Figure 4:
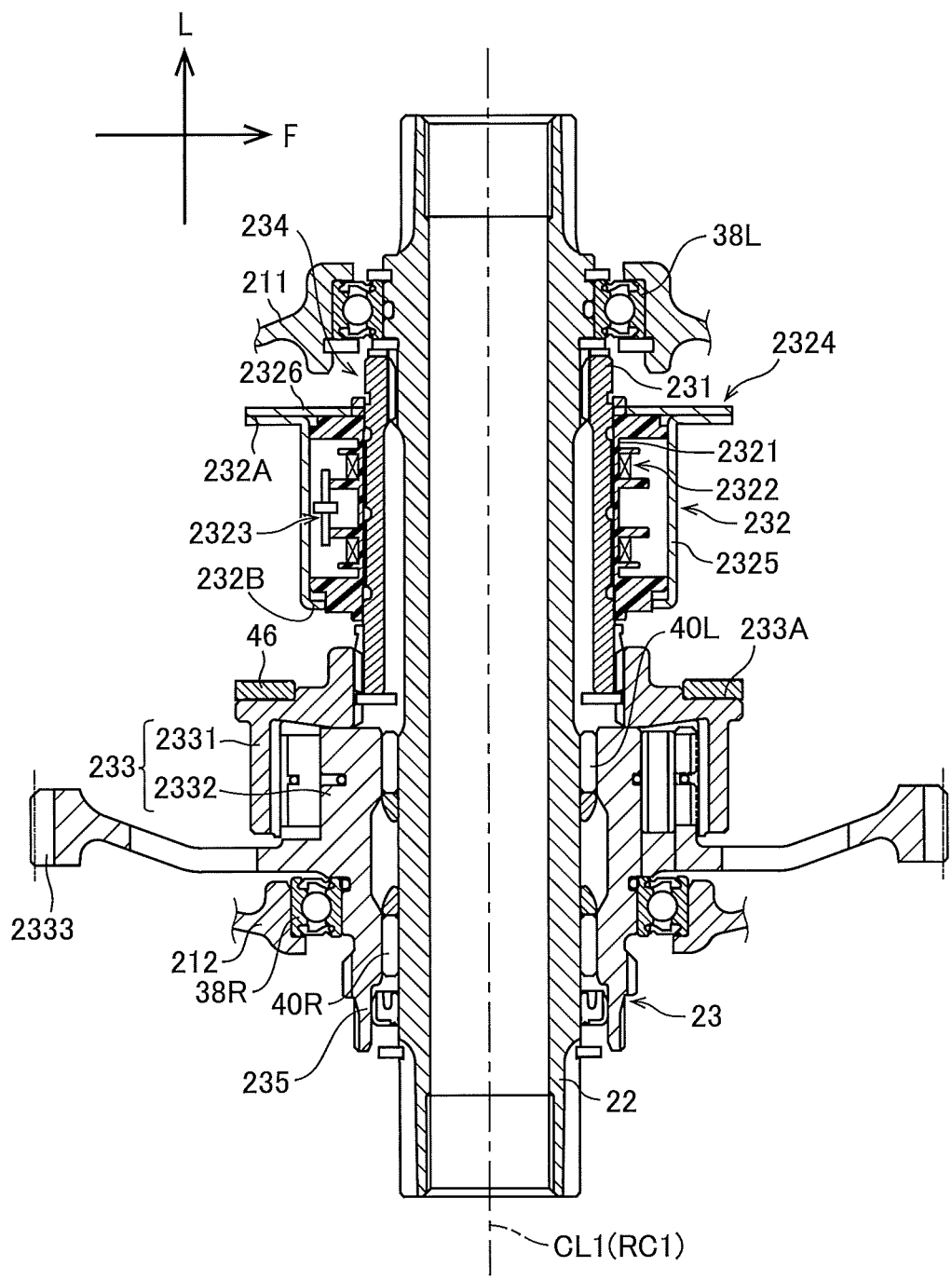
FIG. 4 is an enlarged cross-sectional view of another portion of FIG. 2.

The rotatable shaft 23 will be described with reference to FIG. 4. FIG. 4 is an enlarged vertical cross-sectional view of another portion of FIG. 2.

The rotatable shaft 23 is positioned coaxially with the crank axle 22 and is able to rotate together with the crank axle 22. The crank axle 23 includes a coupling shaft 231 and a one-way clutch 233.

The coupling shaft 231 is cylindrical or substantially cylindrical. The crank axle 22 extends into the coupling shaft 231. The coupling shaft 231 is positioned coaxially with the crank axle 22.

The left end of the coupling shaft 231 (i.e., furthermost position thereon in a first axial direction) is coupled with the crank axle 22 by spline coupling or the like. As such, the coupling shaft 231 rotates together with the crank axle 22 regardless of whether the crank axle 22 rotates in the forward or rearward direction.

A torque detector 232 is provided around the coupling shaft 231. The torque detector 232 is supported on the housing member 211.

The torque detector 232 detects torque generated in the coupling shaft 231 when the rider pedals. The torque detector 232 preferably is a known magnetostrictive torque sensor, for example. The torque detector 232 is disposed around the coupling shaft 231. The torque detector 232 provides a signal associated with the detected torque to a controller mounted on a substrate 48, for example. The controller is configured or programmed to refer to the signal associated with the torque detected by the torque detector 232 in order to recognize the state of the bicycle in terms of the pedaling by the rider, and to control the motor 25.

The torque detector 232 includes a bobbin 2321, a coil 2322, a detector 2323, and a shield 2324.

The bobbin 2321 is cylindrical or substantially cylindrical. The coupling shaft 231 extends through the bobbin 2321. The both ends of the bobbin 2321 in the axial direction are in slidable contact with the outer periphery of the coupling shaft 231. The intermediate portion of the bobbin 2321 in the axial direction is adjacent to the outer periphery of the coupling shaft 231 with a slight gap provided in between. The bobbin 2321 is rotatable relative to the coupling shaft 231. That is, the bobbin 2321 does not rotate together with the coupling shaft 231.

The coil 2322 is wound around the outer periphery of the bobbin 2321. Preferably, a predetermined voltage is applied to the coil 2322.

The detector 2323 detects changes in the voltage across the coil 2322 caused by distortions of the coupling shaft 231. Thus, the torque produced in the coupling shaft 231, i.e., the torque produced in the crank axle 22 as it rotates together with the coupling shaft 231 is detected.

The shield 2324 prevents or significantly reduces the detection precision of the detector 2323 (i.e., precision with which changes in the voltage across the coil 2322 are detected) from being decreased by external magnetic fields. The shield 2324 engages the stop 236 (see FIG. 6) provided on the housing 21 (more particularly, the housing member 211). That is, the shield 2324 does not rotate together with the coupling shaft 231.

The shield 2324 includes a shield 2325 and a shield 2326.

The shield 2325 is cylindrical or substantially cylindrical. The bobbin 2321 is held inside the shield 2325.

A flange 232A is provided on the left end of the shield 2325 (i.e., furthermost position thereon in the first axial direction). The flange 232A extends from the shield 2325 outwardly in radial directions of the shield 2325. A flange 232B is provided on the right end of the shield 2325 (i.e., furthermost position thereon in the second axial direction). The flange 232B extends from the shield 2325 inwardly in radial directions of the shield 2325.

The shield 2326 is annular or substantially annular. The shield 2326 overlaps the flange 232A of the shield 2325 such that the shield 2326 and flange 232A are arranged in the axial direction of the shield 2325. Further, the shield 2326 is fixed to the flange 232A. The shield 2326 is fixed to the flange 232A by screwing or welding, for example.

The one-way clutch 233 is located closer to the housing member 212 than the torque detector 232 is as measured in the axial direction of the crank axle 22. The one-way clutch 233 is positioned coaxially with the crank axle 22.

The one-way clutch 233 includes a driver 2331 and a driven member 2332.

The driver 2331 is cylindrical or substantially cylindrical. The right end of the coupling shaft 231 (i.e., furthermost position thereon in the second axial direction) extends into the left end of the driver 2331 (i.e., furthermost position thereon in the first axial direction). The driver 2331 is positioned coaxially with the coupling shaft 231. The right end of the coupling shaft 231 (i.e., furthermost position thereon in the second axial direction) is coupled with the left end of the driver 2331 (i.e., furthermost position thereon in the first axial direction) by spline coupling or the like. As a result, the driver 2331 rotates together with the coupling shaft 231 regardless of whether the coupling shaft 231 rotates in the forward or rearward direction. That is, the driver 2331 rotates together with the crank axle 22 regardless of whether the crank axle 22 rotates in the forward or rearward direction. The coupling shaft 231 and driver 2331 define and function as a crank rotation input shaft 234 that rotates in an integral manner with the crank axle 22.

An annular attachment surface 233A is provided as a portion of the outer periphery of the driver 2331. The attachment surface 233A expands radially with respect to the driver 2331 and extends in the circumferential direction. The attachment surface 233A is located toward the right of (i.e., farther in the second axial direction than) the left end of the driver 2331 (i.e., furthermost position thereon in the first axial direction). The attachment surface 233A is positioned to overlap a portion of the substrate 48 as viewed in an axial direction of the crank axle 22.

A ring magnet 46 is fixed to the attachment surface 233A. The ring magnet 46 overlaps the driver 2331 as viewed in an axial direction of the crank axle 22. The ring magnet 46 overlaps a portion of the substrate 48 as viewed in an axial direction of the crank axle 22.

The ring magnet 46 rotates together with the driver 2331. Thus, a detector 48A (see FIG. 6) is able to be used to detect changes in magnetic field caused by rotation of the ring magnet 46, thus detecting rotation of the driver 2331 (i.e., the crank axle 22). That is, the rotation detector includes the ring magnet 46 and detector 48A.

The detector 48A (see FIG. 6) is mounted on the substrate 48. The detector 48A is positioned to face the ring magnet 46 such that the detector 48A and the ring magnet are arranged in the axial direction of the crank axle 22.

The driven member 2332 is cylindrical or substantially cylindrical. The crank axle 22 extends into the driven member 2332. Slide bearings 40L and 40R are provided between the driven member 2332 and crank axle 22. Thus, the driven member 2322 is positioned to be coaxial with the crank axle 22 and able to rotate relative to it.

The left end of the driven member 2332 (i.e., furthermost position thereon in the first axial direction) extends into the right end of the driver 2331 (i.e., furthermost position thereon in the second axial direction). A ratchet working as a one-way clutch is provided between the left end of the driven member 2332 (i.e., furthermost position thereon in the first axial direction) and the right end of the driver 2331 (i.e., furthermost position thereon in the second axial direction). Thus, rotational forces in the forward direction from the driver 2331 are transmitted to the driven member 2332, while rotational forces in the rearward direction from the driver 2331 are not transmitted to the driven member 2332.

The driven member 2332 is supported by the bearing 38R fixed to the housing member 212 such that the driven member is able to rotate relative to the housing 21 about the central axis CL1 of the crank axle 22.

The driven member 2332 extends through the housing member 212. The driving sprocket 34 (see FIG. 1) is attached, by the support 33 (see FIGS. 1 and 7, for example), to the portions of the driven member 2332 that are located outward (i.e., to the right) of the housing 21.

The driven member 2332 includes a gear 2333. The gear 2333 engages the gear 241 of the reduction gear 24. The gear 2333 has a larger diameter than the gear 241A and includes more teeth than the gear 241A. That is, the rotational speed of the gear 2333 is lower than the rotational speed of the gear 241A.

The driven member 2332 includes a resultant-force output shaft 235 that provides the resultant of a human-generated force provided through the one-way clutch 233 (i.e., pedaling force) and a motor-generated driving force provided through the gear 2333. That is, the resultant-force output shaft 235 is included in the rotatable shaft 23.

Figure 5:
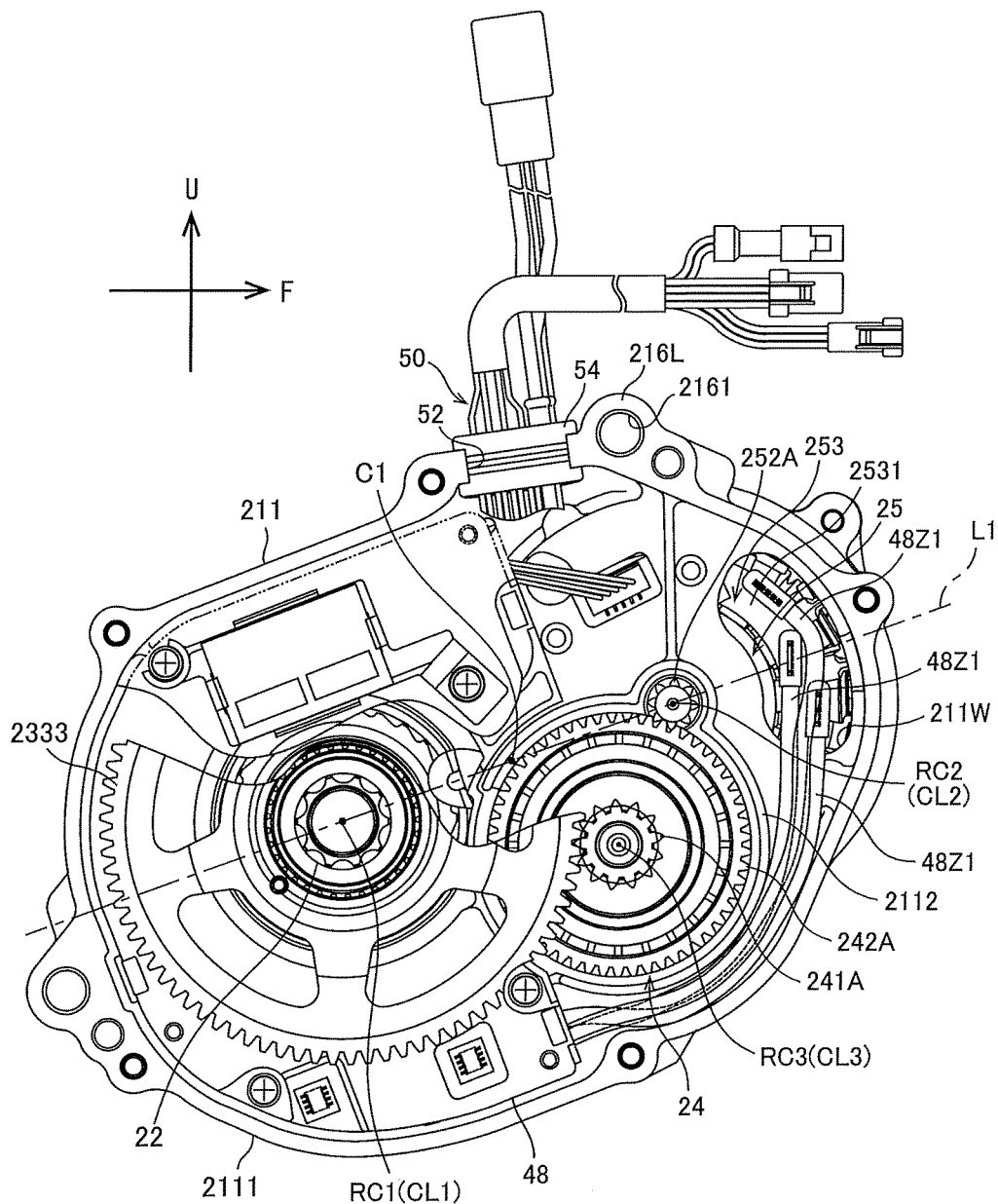
FIG. 5 is a right-side view of the internal construction of the drive unit with the right housing removed.

The relationship between the rotational center RC1 of the crank axle 22, the rotational center RC2 of the rotor 252, and the rotational center RC3 of the reduction gear 24 will be described with reference to FIG. 5. FIG. 5 is a right-side view of the internal construction of the drive unit 20 with the housing member 212 removed.

The rotational center RC3 is located forward of the rotational center RC1 as measured in the front/rear direction with respect to the vehicle. The rotational center RC2 is located forward of the rotational center RC3 as measured in the front/rear direction with respect to the vehicle. That is, the rotational center RC2 is located forward of the rotational center RC1 as measured in the front/rear direction with respect to the vehicle. In short, the motor 25 is located forward of the crank axle 22 as measured in the front/rear direction with respect to the vehicle.

Preferably, the rotational center RC3 is located lower than a straight line L1 connecting the rotational center RC1 to the rotational center RC2 as seen from a side of the vehicle.

Figure 6:
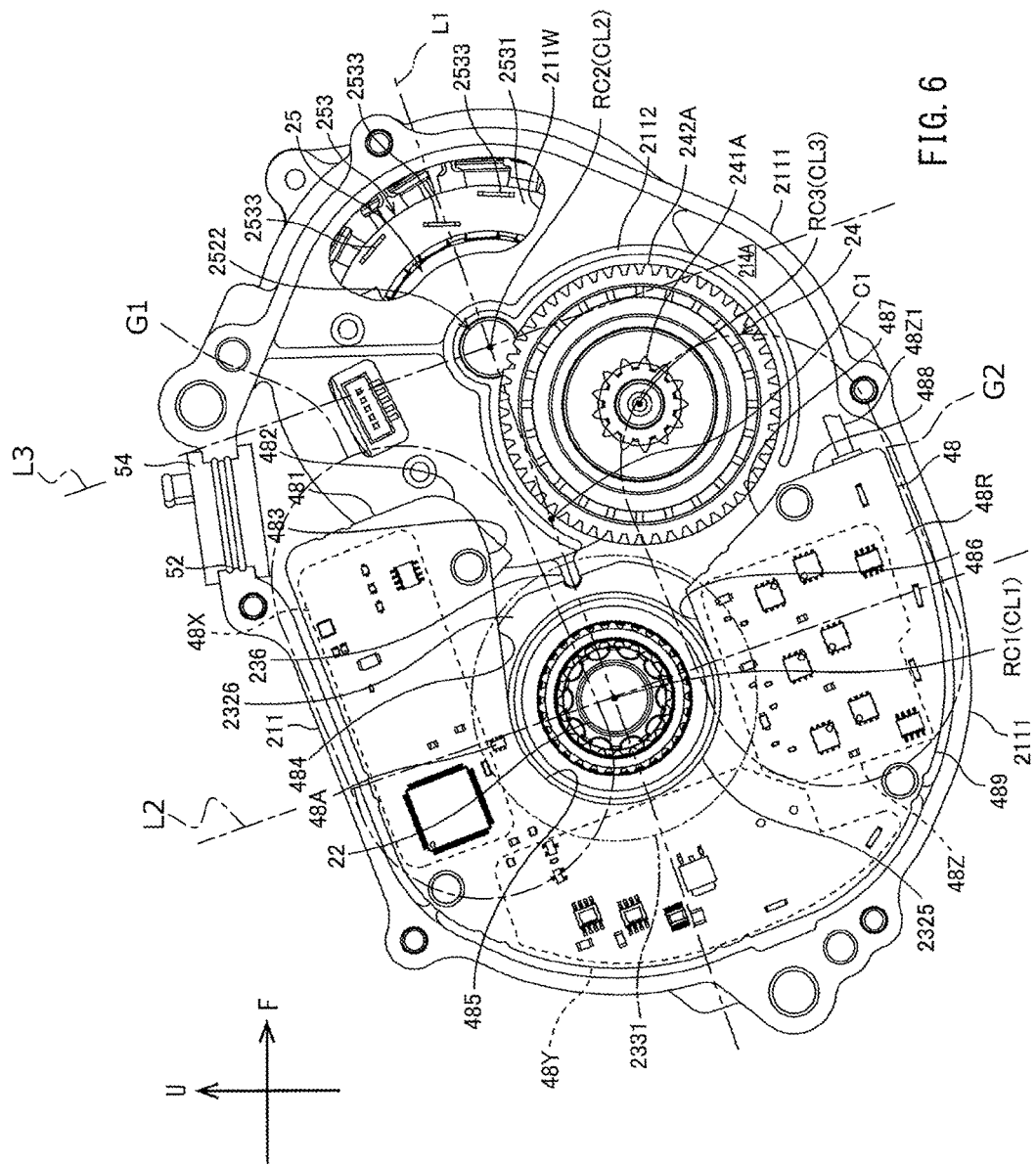
FIG. 6 is a right-side view of the internal structure of the drive unit with the right housing removed and with the one-way clutch removed.

The substrate 48 disposed within the housing 21 will be described with reference to FIG. 6. FIG. 6 is a right side view of the internal structure of the drive unit 20 with the housing member 212 removed and with the one-way clutch 233 removed. In FIG. 6, the driver 2331 is suggested by a phantom line.

Electronic components are mounted on the substrate 48 to control the electric supply to the motor 25. The substrate 48 surrounds the crank axle 22 as viewed in an axial direction of the crank axle 22. That is, the substrate 48 is disposed around the crank axle 22.

The substrate 48 extends in the front-to-rear direction and top-to-bottom direction. That is, the substrate 48 extends in directions crossing radial directions of the crank axle 22. As shown in FIG. 6, the substrate 48 extends counter-clockwise from the top to the bottom around the crank axle 22, for example.

As viewed in an axial direction of the crank axle 22, the substrate 48 is disposed so as not to overlap the reduction gear 24. As shown in FIG. 2, the substrate 48 is disposed to overlap the gear 2333 as viewed in an axial direction of the crank axle 22.

Returning to FIG. 6, the substrate 48 includes an edge portion 481, an edge portion 482, an edge portion 483, an edge portion 484, an edge portion 485, an edge portion 486, an edge portion 487, and an edge portion 488. In the following description, the shapes and positions of the edge portions 481 to 488 are those as viewed in an axial direction of the crank axle 22.

The edge portion 481 is located above the straight line L1. The edge portion 481 defines a first end of the substrate 48 in the direction in which the substrate extends.

The edge portion 481 is located between the rotational centers RC1 and RC2 in the direction in which the straight line L1 extends. The edge portion 481 is located rearward of the rotational center RC3 (that is, relatively close or adjacent to the rotational center RC1) in the direction in which the straight line L1 extends.

The edge portion 481 extends in a direction crossing the straight line L1. As shown in FIG. 6, the edge portion 481 extends in a direction perpendicular or substantially perpendicular to the straight line L1.

A first end of the edge portion 481 is farther from the straight line L1 than the second end of the edge portion 481 as measured in a direction perpendicular or substantially perpendicular to the straight line L1. That is, the first end of the edge portion 481 is located higher than the second end of the edge portion 481.

The first end of the edge portion 481 is located rearward of the second end of the edge portion 481. That is, the first end of the edge portion 481 is located closer to the rotational center RC1 than the second end of the edge portion 481 is as measured in the front-to-rear direction of the vehicle.

The edge portion 482 is located above the straight line L1. The edge portion 482 is located lower than the edge portion 481. The edge portion 482 is located closer to the straight line L1 than the edge portion 481 is as measured in the direction perpendicular or substantially perpendicular to the straight line L1.

The edge portion 482 is located between the rotational centers RC1 and RC2 in the direction in which the straight line L1 extends. The edge portion 482 is located rearward of the rotational center RC3 (that is, relatively close to the rotational center RC1) in the direction in which the straight line L1 extends.

A first end of the edge portion 482 is connected to the second end of the edge portion 481 (i.e., end closer to the straight line L1). The edge portion 482 extends from the second end of the edge portion 481 rearward and downward in the shape of an arc. The second end of the edge portion 482 is located rearward of and lower than the first end of the edge portion 482. As measured in the direction perpendicular or substantially perpendicular to the straight line L1, the distance between the first end of the edge portion 482 and the straight line L1 is greater than the distance between the second end of the edge portion 482 and the straight line L1.

The edge portion 483 is located above the straight line L1. The edge portion 483 is located rearward of and lower than the edge portion 482. The edge portion 483 is located closer to the straight line L1 than the edge portion 481 is as measured in the direction perpendicular or substantially perpendicular to the straight line L1.

The edge portion 483 is located between the rotational centers RC1 and RC2 in the direction in which the straight line L1 extends. The edge portion 483 is located rearward of the rotational center RC3 (that is, relatively close to the rotational center RC1) in the direction in which the straight line L1 extends.

A first end of the edge portion 483 is connected to the second end of the edge portion 482. The edge portion 483 extends straight from the second end of the edge portion 482 rearward and downward. The edge portion 483 extends parallel or substantially parallel to the straight line L1. The second end of the edge portion 483 is located rearward of and lower than the first end of the edge 483. The second end of the edge portion 483 is located rearward of the middle point C1 between the rotational centers RC1 and RC2 (that is, relatively close to the rotational center RC1) in the direction in which the straight line L1 extends.

The edge portion 484 is located above the straight line L1. The edge portion 484 is located rearward of and lower than the edge portion 483. The edge portion 484 is located closer to the straight line L1 than the edge portion 481 is as measured in the direction perpendicular or substantially perpendicular to the straight line L1.

The edge portion 484 is located between the rotational centers RC1 and RC2 in the direction in which the straight line L1 extends. The edge portion 484 is located rearward of the rotational center RC3 (that is, relatively close to the rotational center RC1) in the direction in which the straight line L1 extends. The edge portion 484 is located rearward of the middle point C1 (that is, relatively close to the rotational center RC1) in the direction in which the straight line L1 extends.

A first end of the edge portion 484 is connected to the second end of the edge portion 483. The edge portion 484 extends straight from the second end of the edge portion 483 rearward and downward. The edge portion 484 extends in a direction crossing the straight line L1. That is, the edge portion 484 extends in a direction different from that of the edge portion 483. The second end of the edge portion 484 is located rearward of and lower than the first end of the edge portion 484. The second end of the edge portion 484 is located rearward of the rotational center RC1 (that is, relatively close to the rotational center RC1) in the direction in which the straight line L1 extends.

As measured in the direction perpendicular or substantially perpendicular to the straight line L1, the distance between the first end of the edge portion 484 and the straight line L1 is smaller than the distance between the second end of the edge portion 484 and the straight line L1. That is, the edge portion 484 extends away from the straight line L1 as it extends from the first end toward the second end. As measured in the direction perpendicular or substantially perpendicular to the straight line L1, the first end of the edge portion 484 is located closer to the straight line L1 than the second end of the edge portion 484 is.

A first end of the edge portion 485 is connected to the second end of the edge portion 484. That is, the first end of the edge portion 485 is located above the straight line L1.

The edge portion 485 extends downward from the second end of the edge portion 484 in the shape of an arc. That is, the edge portion 485 extends from the second end of the edge portion 484 in a circumferential direction of the crank axle 22. The edge portion 485 extends for about a half of the circumference of the crank axle 22. The radius of curvature of the edge portion 485 is equal to or substantially equal to the outer diameter of the shield 2325.

The second end of the edge portion 485 is located below the straight line L1. That is, the edge portion 485 crosses the straight line L1. The second end of the edge portion 485 is located forward of and lower than the first end of the edge portion 485. The second end of the edge portion 485 is located at the same or substantially the same position as the rotational center RC1 in the direction in which the straight line L1 extends. That is, the second end of the edge portion 485 is located rearward of the middle point C1 (that is, relatively close to the rotational center RC1) in the direction in which the straight line L1 extends.

The edge portion 486 is located below the straight line L1. That is, the edge portion 486 is located on the side of the straight line L1 that is opposite to the side including the edge portion 481. The edge portion 486 is located rearward of the middle point C1 (that is, relatively close to the rotational center RC1) in the direction in which the straight line L1 extends.

A first end of the edge portion 486 is connected to the second end of the edge portion 485. The edge portion 486 extends straight from the second end of the edge portion 485 forward and upward. The edge portion 486 extends parallel or substantially parallel to the straight line L1. The second end of the edge portion 486 is located forward of and higher than the first end of the edge portion 486. The second end of the edge portion 486 is located rearward of the middle point C1 (that is, relatively close to the rotational center RC1) in the direction in which the straight line L1 extends.

The edge portion 487 is located below the straight line L1. That is, the edge portion 487 is located on the side of the straight line L1 that is opposite to the side including the edge portion 481.

The edge portion 487 is located rearward of the middle point C1 (that is, relatively close to the rotational center RC1) in the direction in which the straight line L1 extends. The edge portion 487 is located rearward of the first end of the edge portion 484 (that is, the second end of the edge portion 483) (that is, relatively close to the rotational center RC1) in the direction in which the straight line L1 extends.

A first end of the edge 487 is connected to the second end of the edge portion 486. The edge portion 487 extends straight from the second end of the edge portion 486 forward and downward. The edge portion 487 extends in a direction crossing the straight line L1. That is, the edge portion 487 extends in a direction different from that of the edge portion 486. The second end of the edge portion 487 is located forward of and lower than the first end of the edge portion 487.

As measured in the direction perpendicular or substantially perpendicular to the straight line L1, the distance between the first end of the edge portion 487 and the straight line L1 is smaller than the distance between the second end of the edge portion 487 and the straight line L1. That is, the second end of the edge portion 487 is farther from the straight line L1 than the first end of the edge portion 487 as measured in the direction perpendicular or substantially perpendicular to the straight line L1.

The edge portion 488 is located below the straight line L1. That is, the edge portion 488 is located on the side of the straight line L1 that is opposite to the side including the edge portion 481. The edge portion 488 defines the second end of the substrate 48 in the direction in which the substrate 48 extends.

The edge portion 488 is located rearward of the middle point C1 (that is, relatively close to the rotational center RC1) in the direction in which the straight line L1 extends. The edge portion 488 is located rearward of the first end of the edge portion 484 (i.e., the second end of the edge portion 483) (that is, relatively close to the rotational center RC1) in the direction in which the straight line L1 extends.

A first end of the edge portion 488 is connected to the second end of the edge portion 487. The edge portion 488 extends straight from the second end of the edge portion 487 forward and downward. The edge portion 488 extends in a direction that is perpendicular or substantially perpendicular to the straight line L1. That is, the edge portion 488 extends in a direction different from that of the edge portion 487.

The second end of the edge portion 488 is located forward of and lower than the first end of the edge portion 488. The second end of the edge portion 488 is farther from the straight line L1 than the first end of the edge portion 488 is as measured in the direction perpendicular or substantially perpendicular to the straight line L1.

The substrate 48 further includes an edge portion 489. As viewed in an axial direction of the crank axle 22, the edge portion 489 extends along the inner side of the side wall 2111 of the housing 21 (more specifically, the housing member 211). As viewed in an axial direction of the crank axle 22, a gap is located between the edge portion 489 and the inner side of the side wall 2111.

Figure 7:
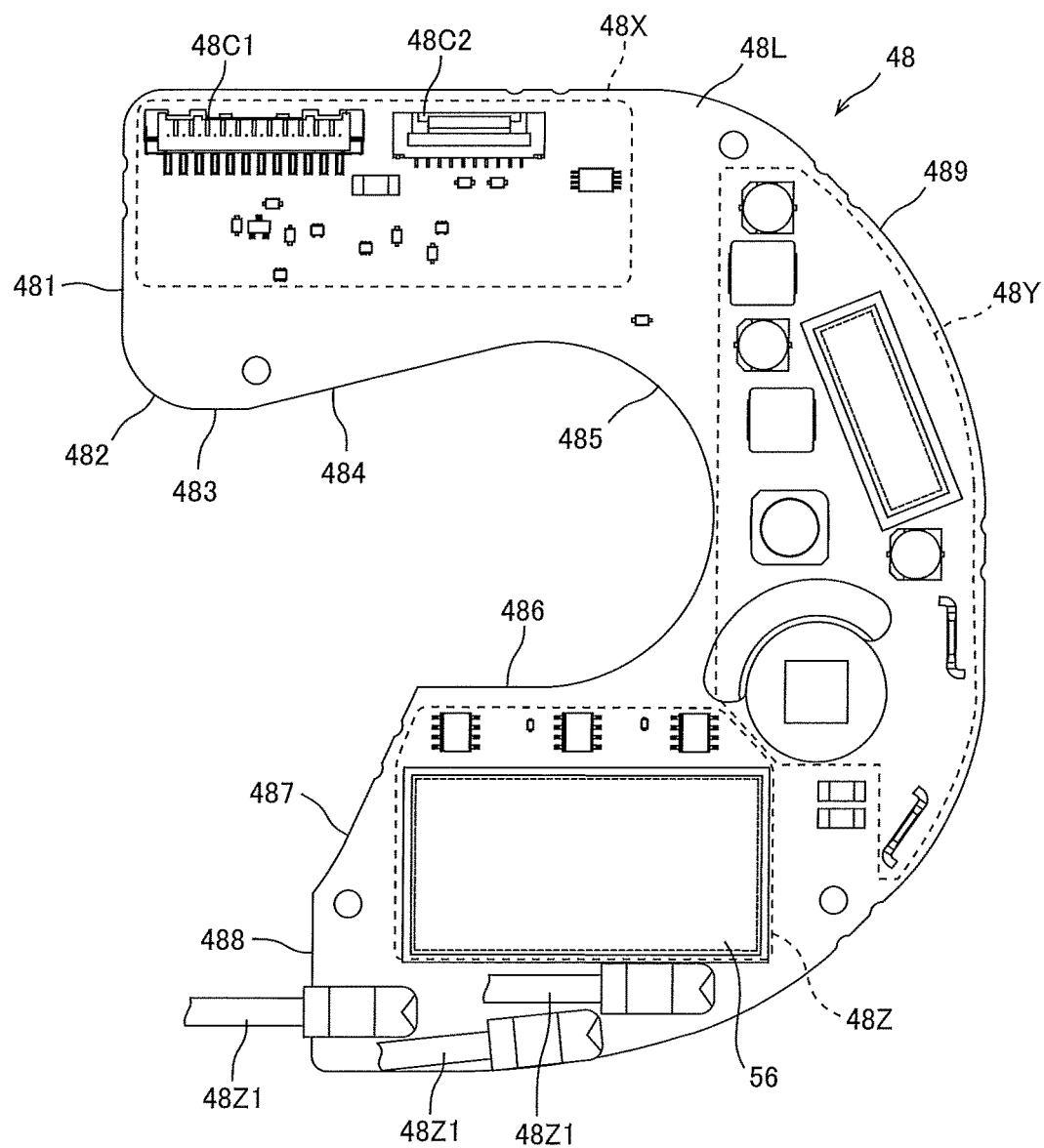
FIG. 7 is a left side view of the substrate.

The component sides 48L and 48R of the substrate 48 will be described with reference to FIGS. 6 and 7. FIG. 6 shows the component side 48R, while FIG. 7 shows the component side 48L. The following description refers to FIG. 6 when discussing the component side 48R, and refers to FIG. 7 when discussing the component side 48L.

The substrate 48 includes two component sides 48L and 48R. Each of the component sides 48L and 48R extends in the front-to-rear direction and the top-to-bottom direction. That is, each of the component sides 48L and 48R extends in directions perpendicular or substantially perpendicular to the central axis CL1 of the crank axle 22. The component sides 48L and 48R need not extend in directions perpendicular or substantially perpendicular in the exact meaning to the central axis CL1 of the crank axle 22. The component sides 48L and 48R are only preferred to extend in directions crossing the central axis CL1 of the crank axle 22.

On the component sides 48L and 48R are mounted a controller 48X, a power unit 48Y (e.g., power supply or power circuitry), and an electricity supply 48Z. These components will be described below with reference to FIG. 6. In the following description, the positions of the controller 48X, power unit 48Y, and electricity supply 48Z are those as viewed in an axial direction of the crank axle 22.

The controller 48X is located above the straight line L1. The controller 48X is located rearward of the edge portion 481 in the direction in which the straight line L1 extends.

The controller 48X is configured or programmed to control the operation of the motor 25. The controller 48X includes a plurality of circuits or circuit elements. The circuits or circuit elements are distributed among the component sides 48L and 48R, for example. Alternatively, the circuits or circuit elements are able to be mounted on only one of the component sides 48L and 48R.

The power unit 48Y is located closer to the edge portion 488 than the controller 48X is as measured in the direction in which the substrate 48 extends. That is, the power unit 48Y is farther from the edge portion 481 than the controller 48X is as measured in the direction in which substrate 48 extends.

The power unit 48Y is located rearward of the controller 48X in the direction in which the straight line L1 extends.

The power unit 48Y is supplied with electric power from the battery 26. The power unit 48Y includes a plurality of circuits or circuit elements. Similar to the circuits or circuit elements of the controller 48X, the circuits or circuit elements of the power unit are distributed among the component sides 48L and 48R, for example. Alternatively, the circuit elements are able to be mounted on only one of the component sides 48L and 48R.

The electricity supply 48Z supplies the motor 25 with electric power supplied to the power unit 48Y. That is, the electricity supply 48Z generates three-phase alternating current to be supplied to the motor 25, for example. The electricity supply 48Z includes a plurality of circuits or circuit elements. Similar to the circuits or circuit elements of the controller 48X, the circuits or circuit elements of the electricity supply are distributed among the component sides 48L and 48R, for example. Alternatively, the circuits or circuit elements are able to be mounted on only one of the component sides 48L and 48R.

The electricity supply 48Z is located closer to the edge portion 488 than the power unit 48Y is as measured in the direction in which the substrate 48 extends. That is, the electricity supply 48Z is farther from the edge portion 481 than the power unit 48Y is as measured in the direction in which the substrate 48 extends.

The electricity supply 48Z is located below the straight line L1. That is, the electricity supply 48Z is located on the side of the straight line L1 opposite to the side including the controller 48X. The electricity supply 48Z is located lower than the rotational center RC3.

Three cables 48Z1 will be described with reference to FIG. 5. The three cables 48Z1 are used to supply the motor 25 with electricity from the electricity supply 48Z.

The manner in which the three cables 48Z1 are connected to the substrate 48 will be described with reference to FIG. 6. One end of each cable 48Z1 is connected to the substrate 48 near the electricity supply 48Z. Each cable 48Z1 is connected to a terminal provided on the component side 48L of the substrate 48.

The manner in which the three cables 48Z1 are connected to the support 253 will be described with reference to FIG. 5. The other end of each cable 48Z1 is connected to the support 253. The three terminals 2533 (see FIG. 6) are provided on portions of the support 253 that are exposed by a window 211W included in the housing member 212. One cable 48Z1 is connected to each of these terminals 2533.

The manner in which the three cables 48Z1 are disposed will be described with reference to FIG. 5. In the following description, the positions of the three cables 48Z1 are those as viewed in an axial direction of the crank axle 22.

The housing member 211 includes a partition wall 2112. The partition wall 2112 is located outward of the reduction gear 24 in radial directions of the reduction gear 24. The partition wall 2112 extends in the circumferential direction of the central axis CL3 of the reduction gear 24.

The side wall 2111 is located outward of the partition wall 2112 in radial directions of the reduction gear 24. That is, a space 214A is disposed between the side wall 2111 and the partition wall 2112 in radial directions of the reduction gear 24.

The three cables 48Z1 extend through the space 214A and are connected to the support 253. That is, the three cables 48Z1 are located outward of the reduction gear 24 in radial directions of the reduction gear 24.

A sheet 56 will be described with reference to FIG. 7. The sheet 56 is disposed on the electricity supply 48Z. The sheet 56 is mainly composed of silicone rubber, for example. The sheet 56 includes components having higher heat conductivities than silicone rubber, for example. These components are present in the silicone rubber as particles, for example. Alternatively, the sheet 56 may be a non-silicone-based sheet.

The sheet 56 is attached to those portions of the substrate 48 on which some of the circuits or circuit elements included in the electricity supply 48Z are mounted. The circuits or circuit elements to which the sheet 56 is attached generate larger amounts of heat during operation than the other circuit elements. The circuits or circuit elements to which the sheet 56 is attached are able to include an inverter circuit that generates three-phase alternating current, for example.

Figure 8:
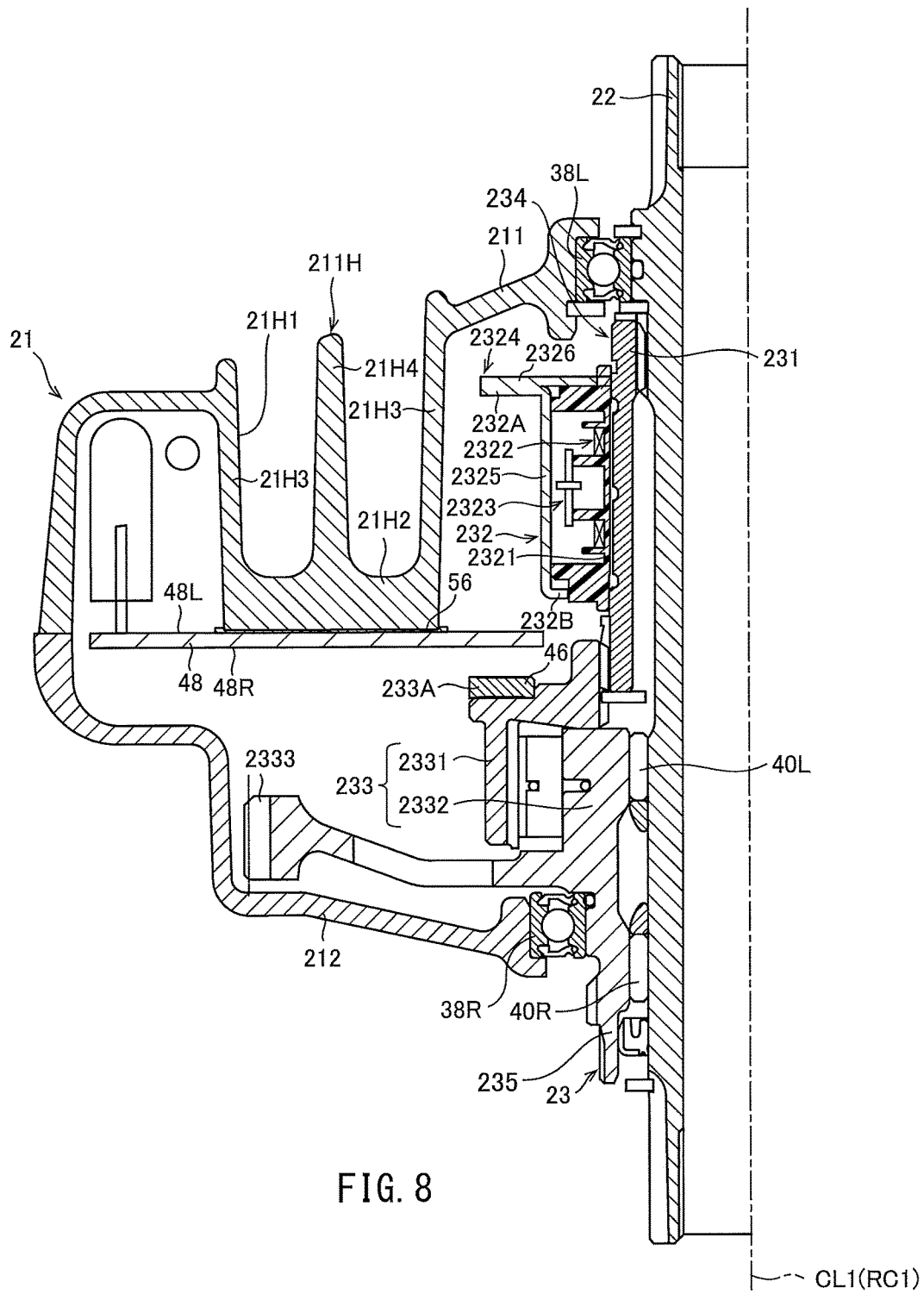
FIG. 8 is a cross-sectional view of the drive unit showing the sheet in contact with the housing.

The sheet 56 will be described with reference to FIG. 8. The sheet 56 is in contact with the inner surface of the housing 21 (more specifically, the housing member 211). Those portions of the housing member 211 with which the sheet 56 is in contact provide a heat sink 211H.

The heat sink 211H includes a recess 21H1 included in the outer surface of the housing member 211. That is, those portions of the heat sink 211H that are in contact with the sheet 56 include the bottom 21H2 of the recess 21H1. The side walls 21H3 of the recess 21H1 include fins of the heat sink 211H. In the structure shown in FIG. 8, a wall 21H4 protrudes from the bottom 21H2 of the recess 21H1. The wall 21H4 includes a fin of the heat sink 211H. The protrusion height of the fins of the heat sink 211H from the outer surface of the housing member 211 are able to be reduced.

The outlet 52 will be described with reference to FIGS. 5 and 6. The outlet 52 is included in the housing 21 to allow the cables 50 (see FIG. 5) connected to the substrate 48 to be routed out. In the present preferred embodiment, a grommet 54 is provided on the outlet 52. The grommet 54 includes an elastic body. The grommet 54 is provided to protect the cables 50 and prevent dust and water from entering. The cables 50 (see FIG. 5) connected to the substrate 48 extend through the grommet 54 and are routed out of the drive unit 20. The cables 50 (see FIG. 5) connected to the substrate 48 are connected to, for example, the battery 26 (see FIG. 1), meters, speed sensors and the like. In the present preferred embodiment, the cables 50 (see FIG. 5) are connected to a connector 48C1 (see FIG. 7) provided on the component side 48L of the substrate 48.

The positional relationship between the outlet 52 and substrate 48 will be described with reference to FIG. 6. In the following description, the positions of the outlet 52 and the substrate 48 are those as viewed in an axial direction of the crank axle 22.

The outlet 52 is located higher than the substrates 48. In the structure shown in FIG. 6, the outlet 52 is located above the edge portion 481. The outlet 52 is located at the same or substantially the same position as the edge portion 481 in the front-to-rear direction with respect to the vehicle (that is, positioned to overlap the edge portion 481 as viewed in the top-to-bottom direction).

The outlet 52 is located forward of the edge portion 483 of the substrate 48 (that is, relatively close to the rotational center RC2) in the direction in which the straight line L1 extends. The center of the opening of the outlet 52 is located forward of the edge portion 481 of the substrate 48 (that is, relatively close to the rotational center RC2) in the direction in which the straight line L1 extends.

In the drive unit 20, as viewed in an axial direction of the crank axle 22, the substrate 48 does not overlap the reduction gear 24, but does overlap the gear 2333. The substrate 48 is disposed around the crank axle 22. This will make it possible to reduce the size of the drive unit 20 as viewed in an axial direction of the crank axle 22 while providing sufficient areas for the component sides 48L and 48R.

In the drive unit 20, the substrate 48 includes two component sides 48L and 48R. This will facilitate providing sufficient areas for component sides compared with examples where the substrate includes only one component side.

In the drive unit 20, the substrate 48 overlaps the driver 2331 as viewed in an axial direction of the crank axle 22. That is, the width of the substrate 48 (i.e., dimension as measured in a direction perpendicular or substantially perpendicular to the direction in which the substrate 48 extends) is able to be increased. This will facilitate providing sufficient component sides for the substrate 48.

In the drive unit 20, the substrate 48 does not overlap the reduction gear 24 as viewed in an axial direction of the crank axle 22. This will make it possible to reduce the dimension of the drive unit 20 as measured in the left-to-right direction. The reasons for this will be explained below.

If it is assumed that the substrate overlaps the reduction gear 24 as viewed in an axial direction of the crank axle 22, the substrate must be disposed at a position different from that of the reduction gear 24 in the axial direction of the crank axle 22. This increases the dimension of the housing 21 as measured in the left-to-right direction. In contrast, according to a preferred embodiment of the present invention, the substrate 48 does not overlap the reduction gear 24 as viewed in an axial direction of the crank axle 22. This will allow the substrate 48 to be disposed at the same or substantially the same position as the reduction gear 24 in the axial direction of the crank axle 22 (that is, to overlap the reduction gear 24 as viewed in a radial direction of the crank axle 22). This will make it possible to reduce the dimension of the housing 21 as measured in the left-to-right direction.

In the drive unit 20, the ring magnet 46 is positioned to overlap the driver 2331 as viewed in an axial direction of the crank axle 22. This will eliminate the necessity of a member that positions the ring magnet outward of the side (i.e., outer periphery) of the driver in radial directions of the crank axle 22. That is, preferably, there is no member that would represent an obstacle to positioning the reduction gear 24 close or adjacent to the gear 2333 as measured in the axial direction of the crank axle 22. This enables the reduction gear 24 to be positioned closer to the gear 2333 as measured in the axial direction of the crank axle 22. This will make it possible to reduce the dimension of the drive unit 20 as measured in the left-to-right direction of the drive unit.

In the drive unit 20, the controller 48X is located at a distance from the electricity supply 48Z. This will prevent or significantly reduce the controller 48X from being affected by noise generated as the electricity supply unit 48Z operates.

In the drive unit 20, the cables 50 connected to the substrate 48 are located at a distance from the electricity supply 48Z. This will prevent or significantly reduce electric signals transmitted through the cables 50 from being affected by noise generated as the electricity supply 48Z operates.

In the drive unit 20, a sheet 56 is attached to those portions of the substrate 48 that are included in the electricity supply 48Z. The sheet 56 is in contact with the housing member 212. This will facilitate escaping, to the housing member 212, of heat generated as the electricity supply 48Z operates.

In the drive unit 20, those portions of the housing member 211 with which the sheet 56 is in contact include the heat sink 211H. This will further facilitate escaping of heat generated as the electricity supply 48Z operates.

While preferred embodiments of the present invention have been described, these embodiments are merely examples that allow the present invention to be carried out. Thus, the present invention is not limited to these embodiments, and the embodiments are able to be modified as appropriate without departing from the spirit of the present invention when carried out.

For example, the substrate 48 is able to include only one component side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit attached to a vehicle-body frame of an electric-motor-assisted bicycle to generate a driving force to be transmitted to a rear wheel, the drive unit comprising:
    a housing;
    a crank axle extending through the housing in a left-to-right direction of the bicycle;
    a crank rotation input shaft, the crank axle extending through the crank rotation input shaft, an end of the crank rotation input shaft being coupled to the crank axle;
    a motor housed in the housing, the motor including a motor output shaft, an output gear being provided on the motor output shaft;
    a reduction gear housed in the housing, the reduction gear that engages with the output gear;
    a resultant-force output axle, the crank axle extending through the resultant-force output axle, the resultant-force output axle being connected to an other end of the crank rotation input shaft with a one-way clutch provided in between, the resultant-force output axle including a driven gear that engages the reduction gear; and
    a substrate housed in the housing; wherein
    as viewed in an axial direction of the crank axle, the substrate does not overlap the reduction gear but does overlap the driven gear, the substrate is disposed around the crank axle, the substrate includes a component side extending in a direction crossing a central axis of the crank axle, and the substrate extends in directions crossing radial directions of the crank axle;
    the substrate includes:
        a first end; and
        a second end located opposite to the first end in a direction in which the substrate extends;
    a first straight line connecting a shaft center of the crank axle and a shaft center of the motor output shaft as viewed in the axial direction;
    a second straight line passing through the shaft center of the crank axle and being perpendicular to the first straight line as viewed in the axial direction;
    a third straight line passing through the shaft center of the motor output shaft and being perpendicular to the first straight line as viewed in the axial direction; wherein
    a first region is located on one side of the first straight line as viewed in the axial direction; and
    a second region is located on an other side of the first straight line that is opposite to the one side of the first straight line, as viewed in the axial direction;
    the first end is located in the first region as viewed in the axial direction;
    the second end is located in the second region as viewed in the axial direction; and
    the first end and the second end are located between the second straight line and the third straight line as viewed in the axial direction.

2. The drive unit according to claim 1, further comprising:
a rotation detector that detects rotation of the crank rotation input shaft; wherein
the crank rotation input shaft includes an attachment surface extending in a radial direction of the crank axle and overlapping the substrate as viewed in the axial direction; and
the rotation detector includes:
a ring magnet located on the attachment surface; and
a detector mounted on the substrate and positioned to face the ring magnet such that the detector and the ring magnet are arranged in the axial direction.

3. The drive unit according to claim 2, wherein
the crank rotation input shaft includes a driver connected to the resultant-force output axle with the one-way clutch provided in between; and
the attachment surface is provided on the driver.

4. The drive unit according to claim 1, wherein the substrate includes:
a controller configured or programmed to control the motor;
power circuitry mounted closer to the second end than the controller as measured in the direction in which the substrate extends, the power circuitry being supplied with electric power from a battery; and
an electricity supply mounted closer to the second end than the power circuitry as measured in the direction in which the substrate extends, the electricity supply supplying the motor with electric power.

5. The drive unit according to claim 4, wherein, as viewed in the axial direction, the controller is located on the one side of the first straight line and the electricity supply is located on the other side of the first straight line, or the controller is located on the other side of the first straight line and the electricity supply is located on the one side of the first straight line.

6. The drive unit according to claim 5, wherein
the housing includes an outlet located above the straight line as viewed in the axial direction such that a cable connected to the substrate is routed outwardly; and
as viewed in the axial direction, the electricity supply is located below the first straight line.

7. The drive unit according to claim 1, wherein the substrate includes a sheet attached to at least a portion of the electricity supply, the sheet being in contact with the housing to transmit heat, generated as the electricity supply operates, to the housing.

8. The drive unit according to claim 7, wherein the housing includes a heat sink that overlaps the sheet as viewed in the axial direction.

9. An electric-motor-assisted bicycle comprising:
the drive unit according to claim 1.

* * * * *